(No Model.)

T. H. SYMINGTON.
DUST GUARD FOR AXLE BOXES.

No. 518,288. Patented Apr. 17, 1894.

WITNESSES
John Amirie
Fred C-H

INVENTOR
T. H. Symington
BY
Grice Stewart
ATTORNEYS

UNITED STATES PATENT OFFICE.

THOMAS HARRISON SYMINGTON, OF BALTIMORE, MARYLAND.

DUST-GUARD FOR AXLE-BOXES.

SPECIFICATION forming part of Letters Patent No. 518,288, dated April 17, 1894.

Application filed August 5, 1893. Serial No. 482,487. (No model.)

*To all whom it may concern:*

Be it known that I, THOMAS HARRISON SYMINGTON, a citizen of the United States, and a resident of Baltimore, Maryland, have invented certain new and useful Improvements in Dust-Guards for Car-Axle Boxes, of which the following is a specification.

My invention relates to a dust guard for car axle boxes and is adapted for use in the form of car axle boxes known as the master car builders' association standard.

Figure 1:
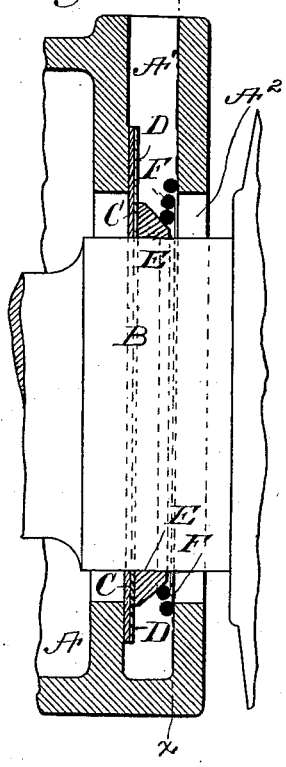
Figure 2:
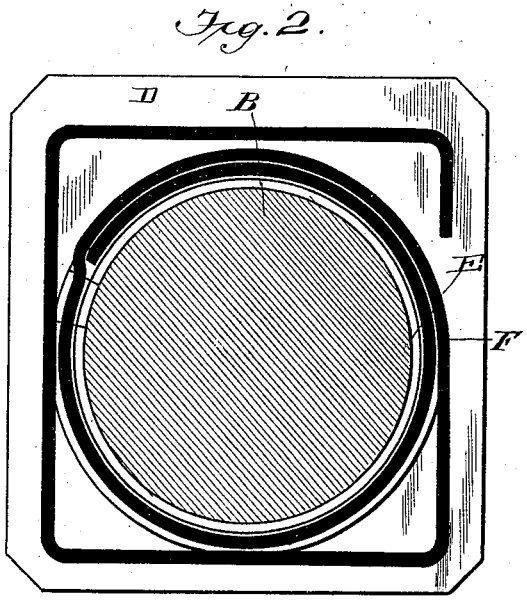
Figure 4:
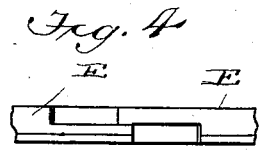
Figure 3:
Figure 5:
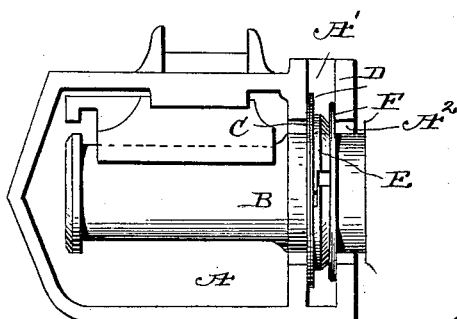
Figure 6:
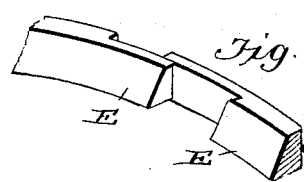

In the drawings Figure 1 is a vertical section of the box and guard showing a portion of the axle in full. Fig. 2 is a rear view of the dust guard. Fig. 3 is a side elevation of the dust guard spring extended. Fig. 4 is an edge view of a portion of the dust guard ring.

In the drawings, A represents the axle box. A' is a dust guard well in the rear thereof, and $A^2$ is the aperture in the rear wall of the box through which the axle passes.

B is the axle.

The dust guard consists of a sheet of felt with a circular aperture in the center, which in Fig. 1 is marked C. Next to this is placed a sheet of metal of similar shape of iron or soft steel, marked D. Next to this is a ring of indurated or vulcanized fiber or other suitable material which is severed, the ends of which overlap each other as shown in Fig. 4. This is the dust guard ring proper and surrounds the axle B and bears againts the exterior face of the plate E. The rear surface of the dust guard ring E is beveled. Bearing upon the dust guard ring E is a spring F which is shown in Figs. 2 and 3. The spring is coiled as shown in the drawings for two purposes, one being to encircle the dust-guard ring and contract upon it and also to fit the well and prevent the spring from rotating with the dust-guard ring or axle. For this purpose one end of the spring wire is formed in a square larger than the opening in the axle box and of a size to prevent its turning in the dust guard well. It bears upon the interior wall of the dust guard well and upon the inclined surface of the dust guard ring E.

It is usual in axle boxes such as are now in use to partially fill the axle box with oil and the dust guard is provided to prevent the escape of the oil from the axle box through the aperture $A^2$, which is much larger than the axle itself, as well as to prevent the entrance of dust through the same. To do this the dust guard must make a tight joint between itself and the interior wall of the dust guard well toward the axle box and also a tight joint between the aperture in the dust guard and the axle B and must adapt itself to changing conditions of relation between the axle and the box, and also must provide for the taking up of any wear which may occur in the dust guard ring E so as to maintain a tight joint around the axle. Both of these objects are accomplished by my dust guard in consequence, first, of the felty character of the sheet C which is pressed against the interior wall of the dust guard well A' by the plate of metal D which is forced against it by means of the spring F and the dust guard ring E. The dust guard ring E is contracted upon the axle B by means of the spring F bearing upon the inclined outer surface of said ring and thereby not only pressing it against the plate D but also contracting it upon the axle B. When the dust guard is to be inserted in the axle box the felt sheet C is placed upon the metal plate D and there inserted into the axle box. The dust guard ring E is then spread apart so that the normally overlapping ends thereof will abut against one another. The spring F is then placed upon it with the circular portion of the spring bearing against the ring E, the spring compressed and the two together slipped into the dust guard well between the exterior wall thereof and the plate D until the aperture in the ring E is coincident with the aperture in the plate D and the felt sheet C. They are then both moved in the well until they are concentric with the aperture $A^2$ and the axle box containing the dust guard is placed upon the axle. The abutting ends of the dust guard ring E are then pushed past one another and the dust guard ring allowed to close upon the axle B under the influence of its spring F. The whole device is then in position for operation and will prevent the escape of oil from the axle box through the aperture $A^2$.

Having thus described my invention, what I claim, and desire to secure by Letters Patent, is—

1. In a dust guard the combination of a sheet of suitable material having a central opening and having sufficient strength to resist the pressure of a spring upon it and of size larger than the aperture in the rear side of the axle box, a severed dust guard ring made of indurated fiber or other suitable material having its rear surface beveled, and a spring within the dust guard well which encircles the ring and contracts upon the inclined rear surface of the dust guard ring and forces it against the sheet, substantially as described.

2. In a dust guard for axle boxes the combination of a sheet of felt having a hole in the middle, a plate of similar shape bearing against said sheet, a severed dust guard ring bearing against the said plate and having its rear surface beveled, and a spring located within the dust guard well encircling the ring and contracting upon the rear beveled surface of the dust guard ring to press it upon the axle and the plate and felt sheet as and for the purpose specified.

3. In a dust guard for axle boxes the combination of a sheet of felt having a hole in the middle, a plate of similar shape next to the sheet of felt, a dust guard ring bearing against the said plate and having its rear surface beveled, said ring being severed and its ends overlapping one another, and a spring located within the dust guard well and encircling the ring and contracting upon the rear beveled surface of the dust guard ring to press it upon the plate and the felt sheet and also to contract it upon the axle.

4. In a dust guard for axle boxes a severed dust guard ring made of suitable material and surrounding the axle and having overlapping ends and beveled on one of its exterior surfaces in combination with a spring encircling the ring and pressing upon said beveled surface, and thereby forcing said ring in two directions, against a seat on the interior of the dust guard well and contracting it upon the axle, substantially as described.

5. In a dust guard for axle boxes the combination of a dust guard ring with a spiral spring one end of which is coiled into a circle of the size of the ring and the other end coiled in a square larger than the opening in the axle box and of a size to prevent its turning in the dust guard well.

Signed at Baltimore, in the State of Maryland, this 3d day of August, A. D. 1893.

THOMAS HARRISON SYMINGTON.

Witnesses:
JOHN L. HEBB,
K. MOREHEAD.